Dec. 22, 1931.  E. H. GRISWOLD ET AL  1,837,542
DEVICE FOR CONTROLLING THE FLOW OF OIL AND GAS FROM WELLS
Filed Jan. 26, 1931
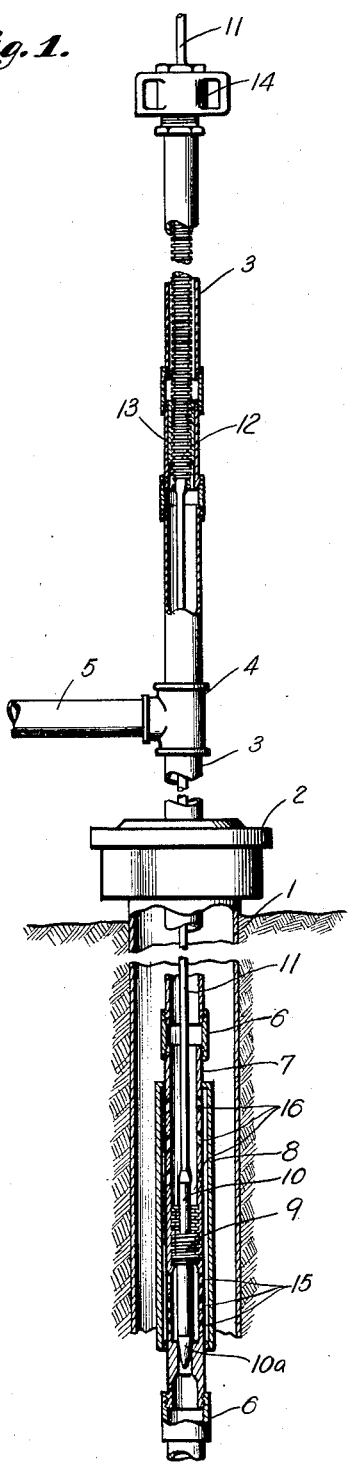
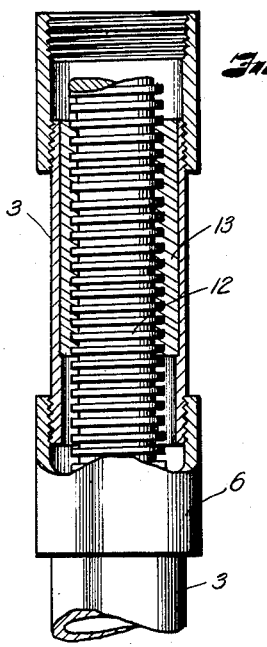
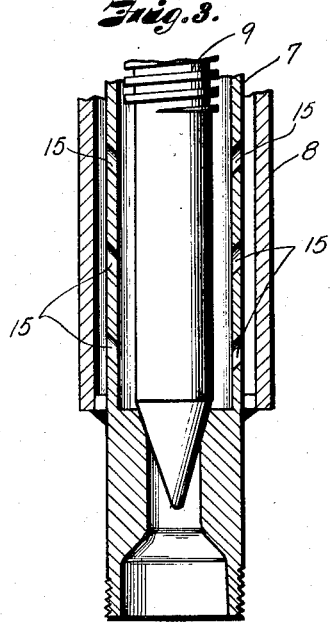
INVENTOR
Edward H. Griswold
and John Nicklos
BY
Thos. E. Scofield
ATTORNEY Patented Dec. 22, 1931

1,837,542

UNITED STATES PATENT OFFICE

EDWARD H. GRISWOLD, OF PONCA CITY, OKLAHOMA, AND JOHN NICKLOS, OF FORT WORTH, TEXAS, ASSIGNORS TO CONTINENTAL OIL COMPANY, OF PONCA CITY, OKLAHOMA, A CORPORATION OF DELAWARE

DEVICE FOR CONTROLLING THE FLOW OF OIL AND GAS FROM WELLS

Application filed January 26, 1931. Serial No. 511,160.

This invention relates to improvements in a device for controlling the flow of fluids from oil wells and refers more particularly to a nozzle arrangement which is regulated from the surface by the rotation of the rods to which the plunger or nozzle is connected, thereby increasing or decreasing the effective area which governs the flow of oil and gas.

Fig. 1 is a view of the device with parts broken away and parts in section.

Fig. 2 is an enlarged detail of the well head screw.

Fig. 3 is an enlarged sectional detail of the bottom hole choke.

Referring to the drawings; at 1 is shown the casing of an oil well, surmounted by the casing head 2. Within the casing is tubing 3 in which is interposed a T-joint 4, to which is connected the flow line 5 to the gas separator. Interposed in the tubing by means of couplings 6 is a bottom hole flow control device which consists of a tubing 7, substantially the diameter of the tubing 3 and connected thereto by means of the couplings 6. Surrounding the tubing 7 is a jacket 8 which forms an annular space outside of the tubing 7. Centrally of the tubing 7 and internally thereof are cut square threads to accommodate the square threaded portion 9 of the spindle 10. The lower end of this spindle is tapered as shown at 10ª to fit into a tapered hole formed in the bottom of the control device 7. The threaded spindle 10 is attached to the rods 11 by a coupling preferably of the clevice and tapered pin type. The upper end of the rods is connected to a threaded spindle 12 which engages the threads of a bushing 13 within the tubing 3. On the top of the tubing 3 is a stuffing box diagrammatically shown at 14, which assures a pressure tight joint around the rod 11.

In operation oil and gas flows up through the lower tubing to the nozzle valve 10ª, past the nozzle valve when open into the control device 7 surrounding the lower portion of the nozzle. Holes 15 in this portion of the tubing permit oil and gas to pass into the annular space between the tubing 7 and the jacket 8 whereby it flows around the threaded portion 9 of the spindle 10. The oil and gas then flows back into the tubing 7, into the portion occupied by the rods 11 through holes 16 positioned above the screw 9. The fluids then pass up the tubing 7, through flow line 5, to the gas separator.

The flow control is positive in operation, due to the fact that the lower square threaded spindle or bottom hole choke or control accurately seats the nozzle or taper valve 10ª and permits definite regulation of the amount of oil and gas permitted to rise into the tubing. The threaded spindle in the upper part of the tubing carries the weight of the rods and holds the rods in sufficient tension to prevent excessive slack or twist occurring in the rods between the top and the bottom thereof, and reduces materially the wear on the upper stuffing box 14. By rotating the rod 11 in one direction, the flow of oil and gas may be increased, while rotation in the other direction decreases the flow to the area of the opening at the nozzle valve 10ª. This control is effected from the surface and, by a selected or adjustable opening, the ratio of the amount of oil and gas permitted to come out of the well can be definitely controlled.

Bottom hole flow control devices are generally known and have been used for some time in the industry. The principal difficulty encountered with devices of this character has been the lack of control in the opening through which the oil and gas flows at the bottom of the hole. By the method described and the use of the device shown, a positive control may be had upon the opening to any degree of fineness, with no difficulty from an operating standpoint.

We claim as our invention:

1. An oil well flow control device comprising upper and lower spindles connected by rods and threaded in the tubing of an oil well, a nozzle valve on the lower end of the lower spindle opened and closed by rotation of the rods.

2. An oil well flow control device comprising upper and lower spindles having threaded engagement with the interior of an oil well tubing and connected by a continuous rod, a nozzle valve at the bottom of the lower spindle controlling the fluid opening to the tubing, the area of the opening regulated by rotation of the rod.

3. An oil well flow control device comprising upper and lower spindles having threaded engagement with the interior of an oil well tubing and connected by a continuous rod, a nozzle valve at the bottom of the lower spindle controlling the fluid opening to the tubing, the area of the opening regulated by rotation of the rod, a jacket surrounding the lower threaded spindle and apertures in the tubing and within the jacket for passing the fluids around the threaded portion of the lower spindle.

In testimony whereof we affix our signatures.

EDWARD H. GRISWOLD.
JOHN NICKLOS.